United States Patent [19]

Logsdon et al.

[11] Patent Number: 5,068,203
[45] Date of Patent: Nov. 26, 1991

[54] METHOD FOR FORMING THIN SILICON MEMBRANE OR BEAM

[75] Inventors: James H. Logsdon; Steven E. Staller, both of Kokomo; David W. De Roo, Carmel; Gerold W. Neudeck, West Lafayette, all of Ind.

[73] Assignees: Delco Electronics Corporation, Kokomo; Purdue Research Foundation, West Lafayette, both of Ind.

[21] Appl. No.: 577,656

[22] Filed: Sep. 4, 1990

[51] Int. Cl.⁵ ............................................. H01L 21/62
[52] U.S. Cl. ................................... 437/89; 29/621.1; 357/26; 437/921
[58] Field of Search .................. 437/921, 89; 29/621.1; 357/26

[56] References Cited

U.S. PATENT DOCUMENTS

| 3,296,040 | 1/1967 | Wigton | 437/89 |
| 3,634,150 | 1/1972 | Horn | 437/89 |
| 4,670,092 | 6/1987 | Motameli | 29/621.1 |
| 4,670,969 | 6/1987 | Yamada et al. | 357/26 |
| 4,706,374 | 11/1987 | Murakami | 437/921 |
| 4,948,456 | 8/1990 | Schubert | 156/611 |

FOREIGN PATENT DOCUMENTS 57-490366 11/1982 Japan ...................... 357/26

OTHER PUBLICATIONS

K. E. Petersen, "Silicon as a mechanical material, " Proc. IEEE, vol. 70, No. 5, p. 420, May 1982.
A. Bohg, "Ethylene diamine-pyrocatechol-water mixture shows etching anomaly in boron-doped silicon," J. Electrochem. Soc., vol. 118, p. 401, Feb. 1971.
T. N. Jackson, M. A. Teschler, and K. D. Wise, "An electrochemical P-N junction etch-stop for the formation of silicon microstructures," IEEE Electron Device Lett., vol. EDL-2, No. 2, p. 44, Feb. 1981.
L. Jastrzebski, "SOI by CVD: epitaxial lateral overgrowth (ELO) process-review," J. Crystal Growth, vol. 63, p. 493, 1983.
P. J. Schubert, G. W. Neudeck, "Confined lateral selective epitaxial growth of silicon for device fabrication,"
IEEE Electron Device Lett., vol. 11, No. 5, p. 181, May 1990.
J. L. Glenn, Jr., G. W. Neudeck, and J. A. Friedrich, "An inverted and stacked PMOS transistor by silicon epitaxial lateral overgrowth," Solid State Electronics, vol. 33, No. 7, p. 881, Aug. 1990.
J. W. Siekkinen, W. A. Klaasen, and G. W. Neudeck, "Selective epitaxial growth silicon bipolar transistors for material characterization," IEEE Trans. Electron Devices, vol. 35, No. 10, p. 1640, Oct. 1988.
D. B. Lee, "Anisotropic etching of silicon," J. Appl. Physics, vol. 40, No. 11, p. 4569, Oct. 1969.
E. Bassous, "Fabrication of novel three-dimensional microstructures by the anisotropic etching of (100) and (110) silicon," IEEE Trans. Electron Devices, vol. 25, No. 10, p. 1178, Oct. 1978.

Primary Examiner—Olik Chaudhuri
Assistant Examiner—Steve Katz
Attorney, Agent, or Firm—Domenica N. S. Hartman; Robert J. Wallace

[57] ABSTRACT

A method is disclosed for forming thin, suspended membranes of epitaxial silicon material. Silicon oxide strips having a predetermined thickness are first formed on a silicon substrate. The gap, or spacing, between adjaceant beams is preferably less than or equal to about 1.4 times the thickness of the silicon oxide strip. The underlying silicon substrate is exposed within these gaps in the silicon oxide layer, thereby the gaps provide a seed hole for subsequent epitaxial growth from the silicon substrate. Epitaxial silicon is grown through the seed holes and then allowed to grow laterally over the silicon oxide strips to form a continuous layer of epitaxial silicon over the silicon oxide strips. The backside of the silicon substrate, or surface opposite the surface having the silicon oxide strips, is then masked to delineate the desired diaphragm and microbridge pattern. The silicon is etched conventionally from the backside. Etching is substantially terminated automatically by the presence of the silicon oxide strips. The thin, single crystal silicon membranes are suitable for use as diaphragms and microbridges in a microaccelerometers or pressure sensor.

8 Claims, 4 Drawing Sheets

METHOD FOR FORMING THIN SILICON MEMBRANE OR BEAM

This invention generally relates to silicon microsensor fabrication techniques. More particularly, this invention relates to the formation of a thin silicon membrane or beam suitable for use in a microaccelerometer or pressure sensor using selective epitaxial growth, epitaxial lateral overgrowth and micromachining techniques.

BACKGROUND OF THE INVENTION

An accelerometer is one of the major sensors used in navigational systems, particularly inertial navigational systems, and on-board automotive safety control systems. Automotive examples of accelerometer use include various anti-lock braking systems, active suspension systems, and seat belt lock-up systems.

Generally, an accelerometer is a device which measures acceleration and, in particular, an accelerometer measures the force that is exerted when a moving body changes velocity. The moving body possesses inertia, which causes the body to resist the change in velocity. It is this resistance to a sudden change in velocity that is the origin of the force which is exerted by the moving body when it is accelerated. This force is proportional to the acceleration component in the direction of the movement, and therefore may be detected by an accelerometer.

In a typical accelerometer, a mass is suspended by two springs attached to opposite sides of the mass. The mass is maintained in a neutral position so long as the system is at rest or is in motion at a constant velocity. When the system undergoes a change in velocity in the direction of the springs' axis or perpendicular to the springs' axis, and therefore is accelerated in a particular direction, the spring mounted mass will at first resist the movement along that axis because of its inertia. This resistance to the movement, or delay in the movement, will force the springs to be temporarily either stretched or compressed. The tensile or compressive force acting on each spring is related to the product of the weight of the mass and the acceleration of the mass. The acceleration is then correspondingly determined by the change in velocity experienced by the mass.

Integrated circuit microaccelerometers having a proof mass suspended by pairs of microbridges are also known. An illustrative example of this type of accelerometer is disclosed in U.S. Patent application Ser. No. 07/304,057 to Chang et al. a "Resonant Bridge Two-Axis Accelerometer", now abandoned. In a microaccelerometer of this type, a proof mass is suspended by at least two pairs of microbridges. Each pair of microbridges is attached to opposite ends of the proof mass along a common axis. The acceleration of the mass is determined by the change in force acting upon each microbridge. This type of resonant microaccelerometer is attractive for precision measurements, because the frequency of a micromechanical resonant structure can be made highly sensitive to physical or chemical signals.

A difficulty exists with regard to the manufacturing of these and other types of microaccelerometers The microbridges are typically formed from extremely thin layers of material, generally silicon, which are suspended over the silicon substrate. These thin layers, or beams, are difficult to manufacture. Similarly, an alternative type of sensor, a pressure sensor, is characterized by a solid thin diaphragm, wherein the same difficulties are experienced in trying to obtain the thin diaphragm. Many techniques have been used to micromachine these components, however there are shortcomings associated with these previous methods.

One common method has been to use an etchant, whereby the rate of etching is dependent upon the doping concentration of the silicon, to etch the silicon substrate and form the thin layers required for the membrane or microbridges. With this method a P+buried layer which is disposed under an N-type epitaxial layer acts as an etch stop when the silicon wafer is etched from the backside However, this method is problematic since a relatively thick layer of the N-type silicon epitaxy is required over the P+buried layer so as to ensure a sufficient amount of the device quality epitaxy after etching. This relatively thick layer of epitaxy directly affects the thickness and thus the sensitivity of the silicon microstructure. It would be desirable to provide a method for micromachining the silicon which would eliminate the P+etch stop, thereby eliminating the corresponding limit on the thickness of the silicon microstructure imposed by the quality of the overlaying epitaxial layer.

Another method used to micromachine silicon microaccelerometers is to use a biased electrochemical etch wherein biased junction acts as the etch stop. A biased junction is formed at the interface between the P-type silicon substrate and overlaying N-type epitaxial layer. The biased junction serves as an etch stop when the silicon substrate is etched from the backside since the N-type epitaxial layer is passivated when exposed to the silicon etch. However, this method requires that electrical contact be made to each silicon wafer during etching of the silicon. Typically, there are many of these silicon microsensors formed on the silicon substrate, requiring constant electrical contact to each of the individual microsensors. Needless to say, maintaining these individual contacts is difficult in the harsh silicon etch environment. Therefore, it would be desirable to provide a method for micromachining the silicon wafer which does not require electrical contacts to be made.

It would also be desirable to provide a method for machining the silicon which provides more uniform dimensional control when forming the thin silicon layers, rather than silicon etch techniques which are relatively difficult to control. This is particularly desirable for automotive applications, where extremely large numbers of the sensors would be produced with the requirement that they all be dimensionally consistent.

Therefore, what is needed is a method for forming thin silicon membranes and beams which are suitable for use in a microaccelerometer or a pressure sensor which alleviates the above-mentioned detriments. In particular a method which utilizes an etch stop technique which does not unduly affect the dimensional characteristics of the microaccelerometer or pressure sensor.

SUMMARY OF THE INVENTION

It is an object of the present invention to provide a method for forming thin silicon membranes and beams.

It is a further object of this invention that such a method use epitaxial growth and micromachining techniques which utilize anisotropy and a silicon oxide etch stop.

It is still a further object of the present invention that such a method for forming thin silicon membranes and beams be useful for forming a microaccelerometer which has a proof mass suspended by thin silicon microbridges or for forming a pressure sensor which has a large, thin diaphragm.

In accordance with a preferred embodiment of this invention, these and other objects and advantages are accomplished as follows.

A method is disclosed for forming thin, suspended membranes or layers of single crystal silicon suitable for use as microbridges and diaphragms in microaccelerometers and pressure sensors.

A layer of silicon oxide is first formed on a silicon substrate and then patterned. In the regions where the diaphragms and microbridges are desired, the silicon oxide is patterned so as to form flat, narrow strips of silicon oxide. The beams have a predetermined thickness, or height. The gap, or spacing, between adjacent silicon oxide strips is preferably less than or equal to about 1.4 the thickness of the silicon oxide strip, however this is not necessary. The underlying silicon substrate is exposed within these gaps in the silicon oxide layer, thereby the gaps provide a seed hole for subsequent epitaxial growth from the silicon substrate. Epitaxial silicon is grown through the seed holes and then allowed to grow laterally over the silicon oxide strips to form a continuous layer of epitaxial silicon over the silicon oxide strips. The backside of the silicon substrate, or surface opposite the surface having the silicon oxide strips, is then masked to delineate the desired diaphragm and microbridge pattern. The silicon is then etched conventionally from the backside.

An inventive feature of this method is that the silicon oxide strips act as etch stops to prevent further etching of the epitaxial silicon, thereby protecting the continuous layer of epitaxial silicon overlying the silicon oxide strips. In addition, anisotropic etching of the silicon within the gap regions terminates automatically within the gap at or below the level of the top surface of the silicon oxide when the width of the gap is less than or equal to about 1.4 times the thickness of the silicon oxide strips. The silicon is removed by the anisotropic etch, terminating on intersecting crystallographic planes within the gap. When the width of the gap is greater than about 1.4 times the thickness of the silicon oxide strips, the etching process does not terminate automatically at the level of the top surface of the silicon oxide and requires close control so as not to harm the thin, overlaying, continuous layer of epitaxial silicon.

With this method, suspended regions of single crystal silicon are formed. The suspended regions are characterized by a continuous layer of epitaxial silicon overlaying the silicon oxide strips The suspended regions are suitable for use as microbridges or diaphragms within a microaccelerometer or pressure sensor.

Other objects and advantages of this invention will be better appreciated from a detailed description thereof, which follows.

DETAILED DESCRIPTION OF THE INVENTION

Thin, suspended membranes of epitaxial silicon are formed. These thin, suspended layers are suitable for use as a microbridge or diaphragm in a microaccelerometer or pressure sensor.

Figure 1:
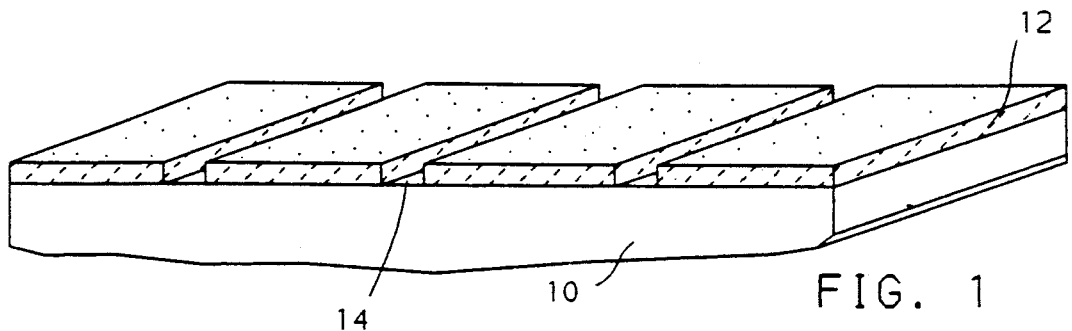
FIGS. 1 through 7 are cross-sectional views depicting the various steps involved in the preferred method for forming the suspended regions of silicon.

As shown in FIG. 1, a layer of silicon oxide is first formed on a silicon substrate 10 and then patterned so as to form flat, narrow strips 12 of the silicon oxide in those regions where a diaphragm or microbridge are desired. The silicon oxide strips 12 have a predetermined thickness, or height. The gap 14, or spacing, between adjacent strips 12 is preferably less than or equal to about 1.4 times the thickness of the silicon oxide strip 12, however this is not necessary. The underlying silicon substrate 10 is exposed within these gaps 14 in the silicon oxide layer 12, thereby the gaps 14 provide a seed hole for subsequent epitaxial growth from the silicon substrate 10.

Figure 2:
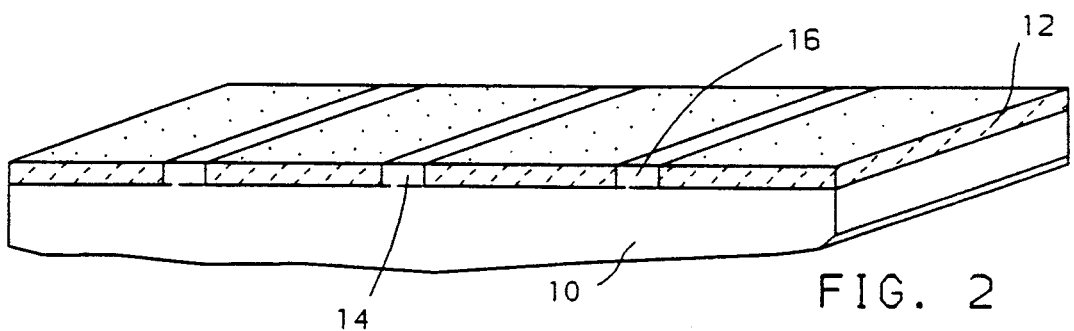

As shown in FIG. 2, epitaxial silicon 16 is grown from the underlying substrate 10 through the seed holes at each gap 14 between the silicon oxide strips 12. It is preferred that the underlying silicon substrate 10 be single crystal oriented along the <100> crystallographic plane for optimal subsequent etching and processing results, however suitable results are also obtained when the underlying silicon substrate 10 is oriented along the <110> crystallographic plane.

Figure 3:
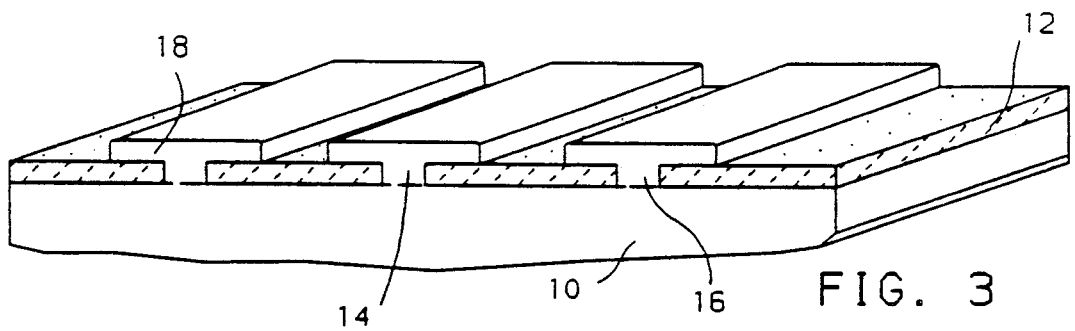
Figure 4:
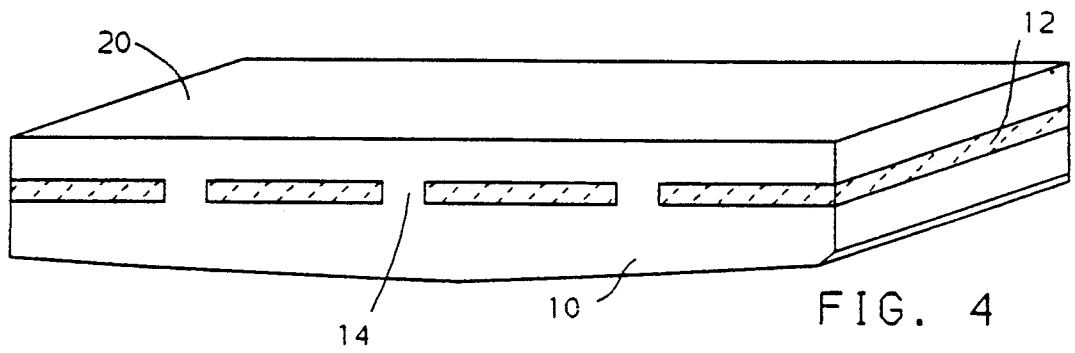

As shown in FIG. 3, the epitaxial silicon 16 within the gap 14 is continuously grown laterally over the silicon oxide strips 12 to form a layer 18 of epitaxial silicon over the silicon oxide strips 12. As shown in FIG. 4, a continuous layer 20 of the epitaxial silicon is formed by allowing the lateral growth of the epitaxial silicon to continue until merged.

In order to form the continuous layer 20 of epitaxial silicon, the single crystal epitaxial silicon is grown from the underlying substrate 10 through the seed hole or gap 14 and then laterally over the silicon oxide strips 12. The preferred epitaxial growth conditions are as follows: an appropriate mixture of dichlorosilane and hydrogen chloride gases in a hydrogen carrier gas at a temperature varying between about 900° C. to about 950° C., and a low pressure, i.e., less than approximately 150 Torr, in either a barrel or pancake type epitaxy reactor. The preferred gas mixture for forming N-type epitaxial silicon is characterized by a mass flow ratio of the dichlorosilane to hydrogen chloride to flowing hydrogen of about one to three to 100; a specific example being a dichlorosilane mass flow of about 0.22 standard liters per minute (slm), a hydrogen chloride mass flow of about 0.59 slm and hydrogen flowing at about 60 slm at a temperature of about 920° C. to about 950° C. These exemplary processing parameters result in the N-type epitaxial silicon being grown at about a rate of 0.1 micrometers per minute. The N-type epitaxial silicon is preferred because it results in the most controlled dimensions during subsequent processing and etching of the silicon, however other dopant species may be introduced into the epitaxial silicon with satisfactory results.

A preferred thickness for the selective epitaxial growth silicon is about 1 micrometer. Therefore about 10 minutes at these processing conditions is required to produce the epitaxial silicon to this preferred thickness within the gap region 14, however further exposure to these processing conditions is required to form the laterally grown, continuous layer 20 of epitaxial silicon overlaying the silicon oxide strips 12. About 5 micrometer to 10 micrometer thickness is preferred since a membrane of this thickness will be highly sensitive and responsive to movement in a microaccelerometer or pressure sensor, yet relatively durable also. Theoretically, almost any membrane thickness may be formed with this method.

For continuous epitaxial silicon films 20 laterally grown in this manner, an aspect ratio of about 1 to 1 has been obtained. Therefore, it is preferred that the silicon oxide strips 12 be not wider than twice the desired aspect ratio so that the laterally grown epitaxial silicon 18 may form a continuous layer 20 over the silicon oxide strips 12. This assumes that seed holes 14 to the underlying substrate 10 are provided on each side of the silicon oxide strip 12 in those regions where a continuous layer 20 of epitaxial silicon is desired.

Figure 5:
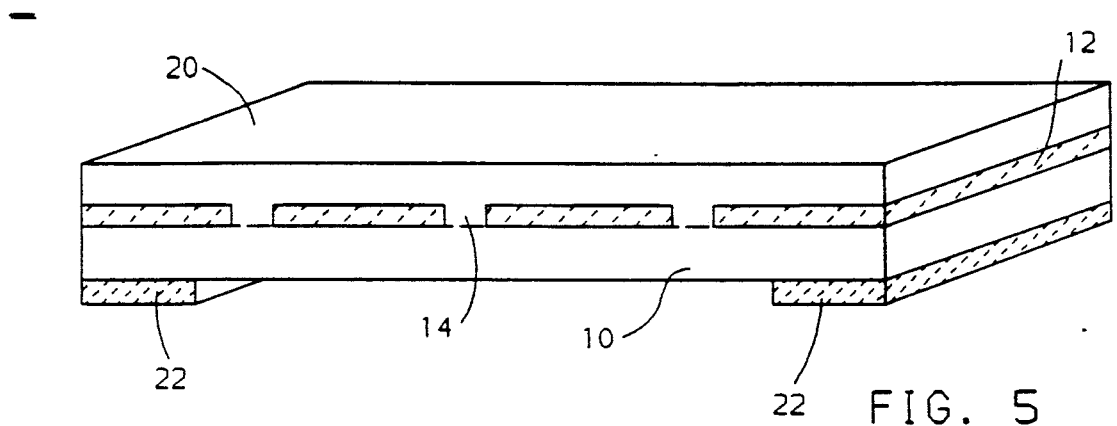
Figure 6:
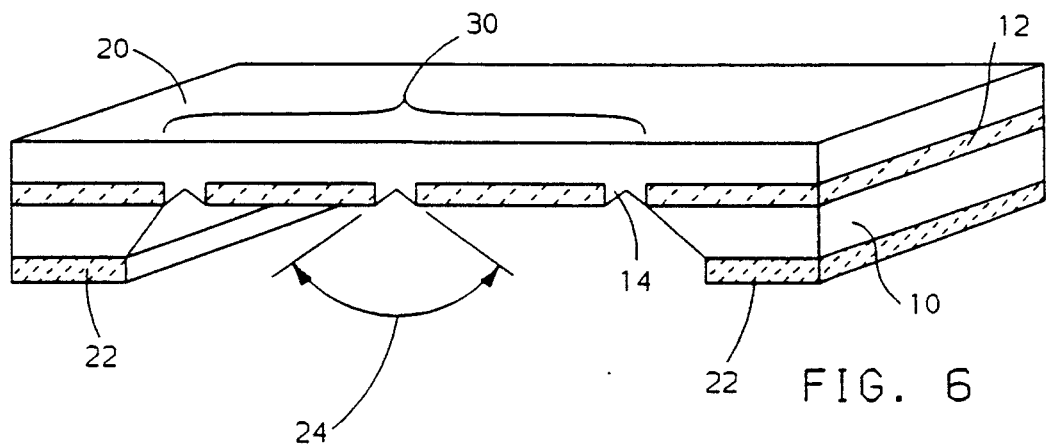

As shown in FIG. 5, the backside of the silicon substrate 10, or surface opposite the surface having the silicon oxide strips 12 and overlaying epitaxial film 20, has a layer of silicon oxide 22 grown on it which is then conventionally masked and patterned to delineate those regions where the subsequently formed suspended layers of epitaxial silicon are desired. As shown in FIG. 6, the silicon substrate 10 is etched conventionally from the backside to remove the substrate 10 material under the desired suspended regions.

Figure 7:
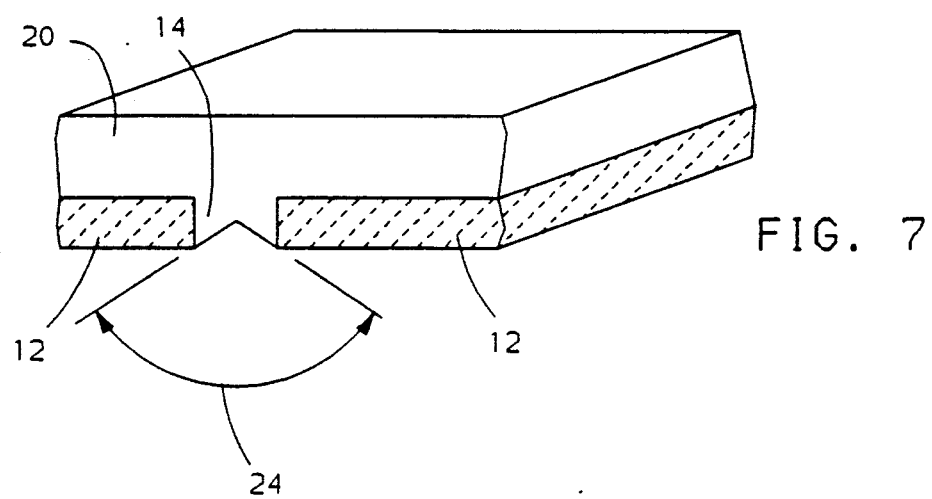

It is preferred that a wet etch, such as KOH or ethylenediamine pyrocatechol (EDP), be used initially to etch the silicon substrate 10 until the silicon oxide strips 12 are exposed, as shown in FIG. 6 and enlarged in FIG. 7. As shown in these Figures, the width of the gap 14 between silicon oxide strips 12 is less than about 1.4 times the thickness of the silicon oxide strips 12, thereby the etching process within the gap region 14 will terminate automatically. A second etching step using either the plasma or reactive ion etching techniques could be used to etch the beams from the front side since these techniques result in a more controlled etching process than the wet electrochemical etch, however these methods are also much slower and more time consuming than the wet etching technique and therefore not desirable for the first etching step for removal of the bulk of the silicon substrate 10.

An inventive feature of this invention is that the silicon oxide strips 12 act as etch stops to prevent further etching of the epitaxial silicon 18. In addition, as stated above, etching of the epitaxial silicon 18 within the gaps 14 between silicon oxide strips 12 terminates automatically within the gap 14 when the width of the gap 14 is less than 1.4 times the thickness of the silicon oxide strip 12, as shown in FIGS. 6 and 7. This is because the epitaxial silicon is etched anisotropically; terminating along the <111> crystallographic plane, or more simplistically, the silicon is removed by the anisotropic etch along crystallographic planes 24, as shown in FIG. 6 and enlarged in FIG. 7. Within the gap 14, these crystallographic axis 24 intersect, and thereby prevent subsequent removal of epitaxial silicon.

Suspended regions 30 of the continuous layer 20 of epitaxial single crystal silicon are formed with this method, as shown in FIG. 6. The suspended regions 30 are useful as thin membranes or diaphragms for use in microaccelerometers or pressure sensors.

Figure 8:
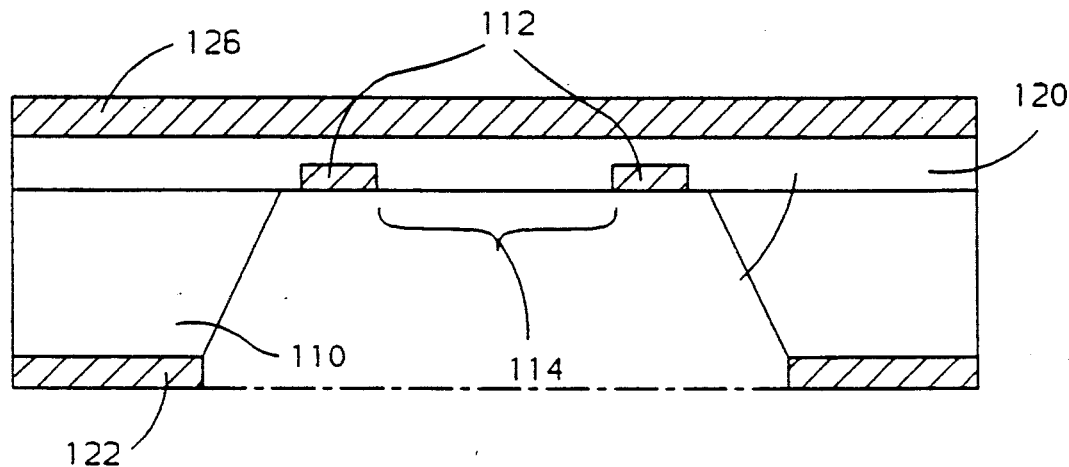
FIGS. 8 through 10 are cross-sectional views depicting an alternative method for forming the suspended regions of silicon using the method of this invention.
Figure 9:
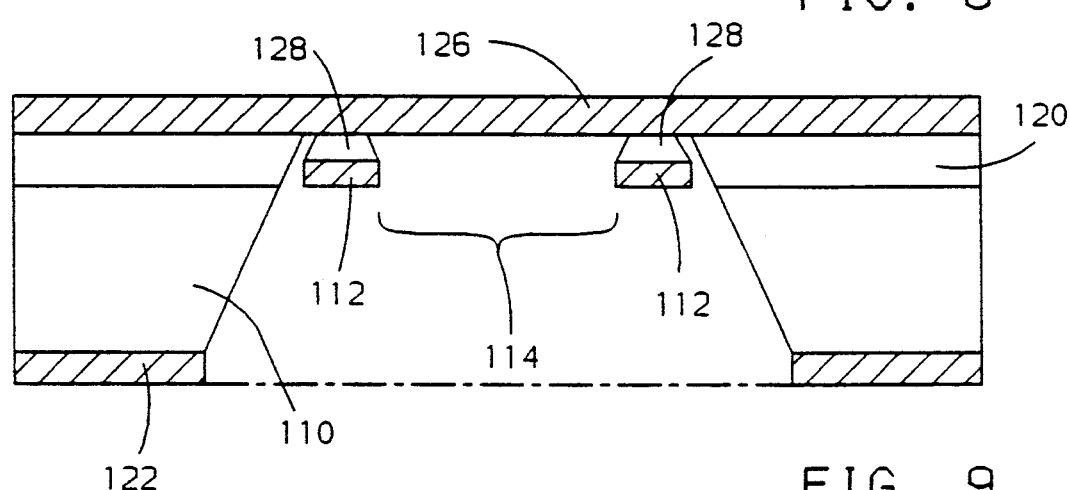

As shown in FIG. 8, if desired for a microaccelerometer, the gap 114 between silicon oxide strips 112 may be greater than twice the thickness of the silicon oxide strips 112. If so, then a second layer of silicon oxide 126 may be deposited over the epitaxially grown, continuous silicon layer 120 prior to etching from the backside of the silicon substrate 110 through the silicon oxide masking layer 122 as shown in the cross-sectional view in FIG. 8. This second overlaying oxide layer 126 acts as the etch stop for removal of epitaxial silicon 120 within the gap region 114, as shown in FIG. 9.

Figure 10:
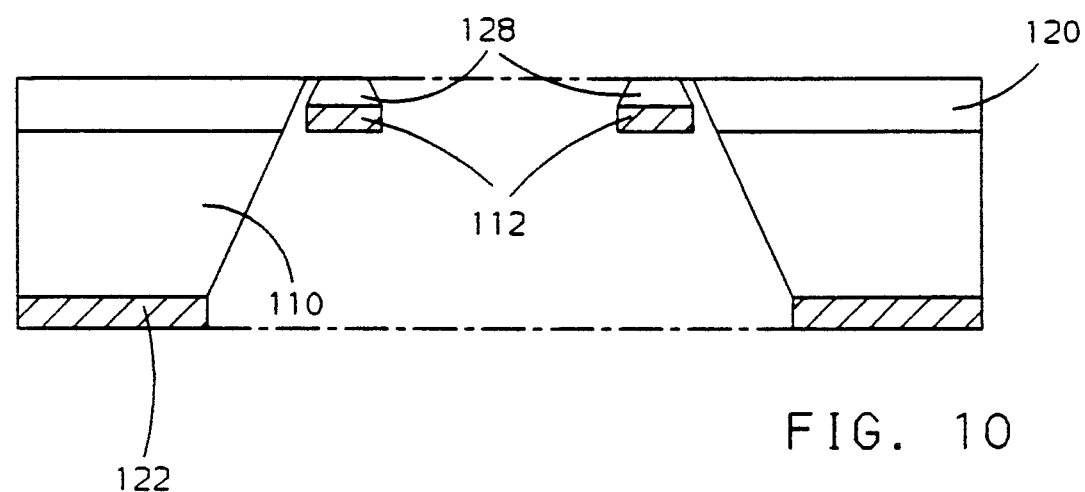

With this alternative method, the overlaying layer of silicon oxide 126 may then subsequently be removed as shown in FIG. 10 or may be left as it is depending on the desired final characteristics of the suspended membrane. It should be noted that in FIG. 10 the suspended regions 128 are attached to the substrate 110 at regions not shown in the particular cross section depicted in the illustration.

With this general method, suspended regions of epitaxial single crystal silicon are formed The suspended regions are characterized by a continuous layer of epitaxial silicon overlaying the silicon oxide strips. The suspended regions are suitable for use as diaphragms or microbridges within a microaccelerometer or a pressure sensor.

Figure 11:
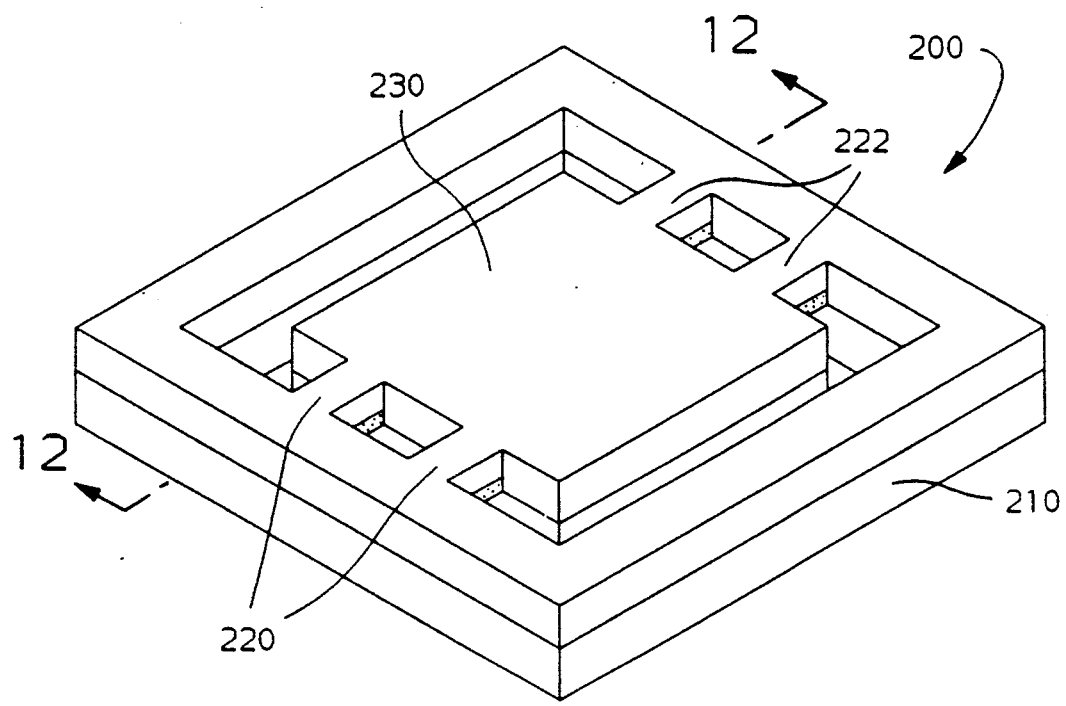
FIGS. 11 and 12 are cross-sectional and plane views respectively of a microaccelerometer having suspended regions of silicon formed in accordance with the preferred method.
Figure 12:
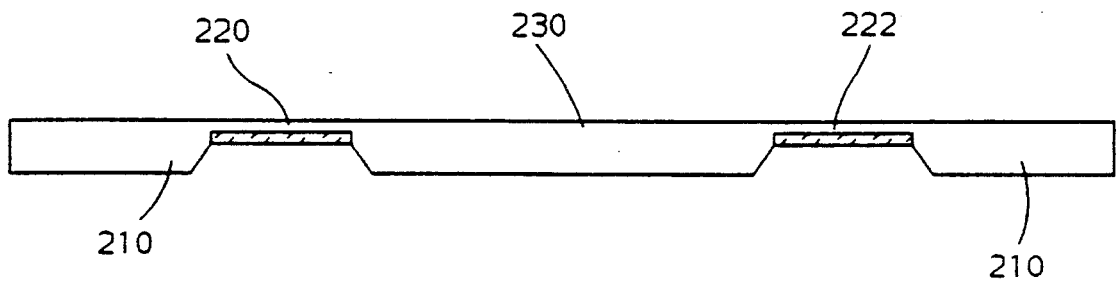

As an illustrative example of how the suspended regions of epitaxial silicon may be used in a microsensor, a microaccelerometer having thin regions of suspended silicon, or microbridges, is discussed. This invention may also be use to form a thin single crystal silicon diaphragm in a pressure sensor. An illustrative example of a microaccelerometer 200 having a suspended proof mass or membrane 230 attached to the substrate 210 by two pairs of microbridges 220 and 222, is shown in FIG. 11 and cross-sectionally in FIG. 12. The microbridges 220 and 222 may be formed with this method.

The microaccelerometer 200 measures the components of acceleration in the plane of the silicon substrate 210. Preferably the silicon microaccelerometer 200 comprises two pairs of microbridges 220 and 222 which are orthogonally attached to the silicon proof mass 230. In order to cancel temperature and material effects to first order, the microbridge elements 220 and 222 which are attached to opposite sides of the proof mass 230 should be matched, so that they experience differential axial loads during acceleration The inertial force on the proof mass 230, due to acceleration in the plane of the substrate 210, generates the differential axial loads on the opposing microbridges in each pair 220 and 222 thereby causing a corresponding change in the piezoresistors formed in the beams.

The method for forming thin single crystal silicon membranes disclosed herein provides several advantages. The thickness and width of a membrane may be controlled to very small dimensions (such as even less than one micrometer), and therefore the sensitivity of any resulting device is increased. In addition, the thickness of the membrane is uniform and predictable since the thickness is determined by the crystal growth rate, i.e., about 0.1 micrometers per minute, thereby enhancing the reproducibility and reliability of any resulting device. Lastly, with this method there is great flexibility in the design parameters of an accelerometer or pressure sensor or other device having a thin silicon region, since the dimensions of the suspended membrane or microbridges may be increased or reduced rather easily.

Although this invention discloses a preferred method for forming suspended layers of epitaxial silicon, which are suitable for use in a microaccelerometer or a pressure sensor, it is to be understood that various modifications and changes may be made in the processing parameters, use and construction without departing from the spirit of the invention, such as by varying the conductivity type of epitaxial silicon grown and accordingly the gas composition within the epitaxial reactor or by modifying the processing parameters and materials within the scope of the art. For this reason, these variations are properly considered within the scope of this invention and accordingly the scope of our invention is to be limited only by the following claims.

The embodiments of the invention in which an exclusive property or privilege is claimed are defined as follows:

1. A method for forming thin suspended membranes or layers of single crystal silicon suitable for use as microbridges and diaphragms in microaccelerometers and pressure sensors comprising the following steps:

providing a silicon substrate oriented essentially along a single crystallographic plane having a front and back surface which are substantially parallel to each other;

forming a blanket layer of silicon oxide overlaying said front surface of said silicon substrate;

patterning said blanket layer of silicon oxide so as to form a plurality of silicon oxide strips in spaced relationship with each other, said silicon oxide strips are spaced so that the underlying silicon substrate is exposed a gaps disposed between adjacent pairs of said strips;

selectively epitaxially depositing monocrystalline silicon onto said silicon substrate exposed at said gaps and then laterally from said gap over said silicon oxide strips so as to form a substantially continuous layer of epitaxial silicon over said plurality of silicon oxide strips;

masking said back surface of said silicon substrate so as to expose a desired pattern of said back surface of said silicon substrate; and removing said exposed silicon from said back surface of said silicon substrate in said desired pattern;

whereas said removing step is substantially terminated at said silicon oxide strips so as to form suspended regions containing said epitaxial silicon overlaying said silicon oxide strips.

2. A method for forming thin suspended membranes or layers of single crystal silicon suitable for use as microbridges and diaphragms in microaccelerometers and pressure sensors comprising the following steps:

providing a silicon substrate oriented essentially along a single crystallographic plane having a front and back surface which are substantially parallel to each other;

forming a blanket layer of silicon oxide overlaying said front surface of said silicon substrate;

patterning said blanket layer of silicon oxide so as to form a plurality of silicon oxide strips in spaced relationship with each other, each of said silicon oxide strips characterized essentially by said predetermined thickness, said silicon oxide strips are spaced so that the underlying silicon substrate is exposed a gaps disposed between adjacent pairs of said beams, the width of each gap is less than or equal to about 1.4 times said predetermined thickness of said silicon oxide strips;

selectively growing single crystal epitaxial silicon on said silicon substrate up through said gaps by vertical epitaxial deposition and then laterally growing single crystal epitaxial silicon over said silicon oxide strips by lateral epitaxial deposition until lateral deposition from adjacent gaps merges, so as to form a substantially continuous layer of epitaxial silicon over said plurality of silicon oxide strips;

masking said back surface of said silicon substrate so as to expose a desired pattern of said back surface of said silicon substrate; and removing said exposed silicon from said back surface of said silicon substrate in said desired pattern;

whereas said removing step is substantially terminated at said silicon oxide strips and within said gaps so as to form suspended regions containing said epitaxial silicon overlaying said silicon oxide strips.

3. The method as recited in claim 2 wherein said silicon substrate is oriented along the <100> crystallographic plane.

4. The method as recited in claim 3 wherein said epitaxial silicon is characterized by N-type conductivity.

5. A method for forming thin suspended membranes or layers of single crystal silicon suitable for use as microbridges and diaphragms in microaccelerometers and pressure sensors comprising the following steps:

providing a silicon substrate oriented essentially along the <100> crystallographic plan having a front and back surface which are substantially parallel to each other;

forming a blanket layer of silicon oxide overlaying said front surface of said silicon substrate;

patterning said blanket layer of silicon oxide so as to form a plurality of silicon oxide strips in spaced relationship with each other, each of said silicon oxide strips characterized essentially by said predetermined thickness, said silicon oxide strips are spaced so that the underlying silicon substrate is exposed at gaps disposed between adjacent pairs of said beams, the width of each gap is less than or equal to about 1.4 times said predetermined thickness of said silicon oxide strips;

selectively growing single crystal silicon by epitaxial deposition onto said silicon substrate exposed at said gaps and then laterally into mutual merger over said silicon oxide strips so as to form a substantially continuous layer of epitaxial silicon over said plurality of silicon oxide strips;

masking said back surface of said silicon substrate so as to expose a desired pattern of said back surface of said silicon substrate; and removing said exposed silicon from said back surface of said silicon substrate in said desired pattern;

whereas said removing step is substantially terminated at said silicon oxide strips and within said gaps so as to form suspended regions containing said epitaxial silicon overlaying said silicon oxide strips.

6. The method as recited in claim 5 wherein said selectively grown epitaxial silicon is characterized by N-type conductivity.

7. A method for forming thin suspended membranes or layers of single crystal silicon suitable for use as microbridges and diaphragms in microaccelerometers and pressure sensors comprising the following steps:

providing a silicon substrate oriented essentially along a single crystallographic plane having a front and back surface which are substantially parallel to each other;

forming a first blanket layer of silicon oxide overlaying said front surface of said silicon substrate;

patterning said first blanket layer of silicon oxide so as to form a plurality of silicon oxide strips in spaced relationship with each other, said silicon oxide strips are spaced so that the underlying silicon substrate is exposed at gaps disposed between adjacent pairs of said beams;

selectively growing single crystal silicon by vertical epitaxial deposition onto said silicon substrate exposed at said gaps and then by lateral epitaxial deposition over said silicon oxide strips at least until lateral deposition fronts from all adjacent gaps meet along their entire length, so as to form a substantially continuous layer of epitaxial silicon over said plurality of silicon oxide strips;

forming a second blanket layer of silicon oxide over said substantially continuous layer of epitaxial silicon;

masking said back surface of said silicon substrate so as to expose a desired pattern of said back surface of said silicon substrate; and removing said exposed silicon from said back surface of said silicon substrate in said desired pattern;

whereby said removing step is substantially terminated at said second blanket layer of silicon oxide so as to form suspended regions containing said epitaxial silicon overlaying said silicon oxide strips.

8. The method as recited in claim 7 wherein said silicon substrate is substantially a single crystal oriented along the <100> crystallographic plane.

* * * * *